No. 875,944. PATENTED JAN. 7, 1908.
M. A. NASH.
PAN.
APPLICATION FILED MAR. 31, 1906.

Witnesses
Frank Hough
C. C. Hines

Inventor
M. A. Nash.

By Victor J. Evans
Attorney

UNITED STATES PATENT OFFICE.

MARY A. NASH, OF PALMYRA, NEBRASKA.

PAN.

No. 875,944.  Specification of Letters Patent.  Patented Jan. 7, 1908.

Application filed March 31, 1906. Serial No. 309,138.

*To all whom it may concern:*

Be it known that I, MARY A. NASH, a citizen of the United States of America, residing at Palmyra, in the county of Otoe and State of Nebraska, have invented new and useful Improvements in Pans, of which the following is a specification.

This invention relates to pans for catching the drip water from refrigerators, the object of the invention being to provide a pan of this character which will not sweat in use and form water of condensation to run upon and injure the floor or floor covering, which is so constructed as to permit of its convenient insertion beneath a refrigerator and its ready withdrawal therefrom, which may be easily cleansed and emptied of its contents, and which, withal, is simple of construction and may be produced at a low cost.

Figure 1:
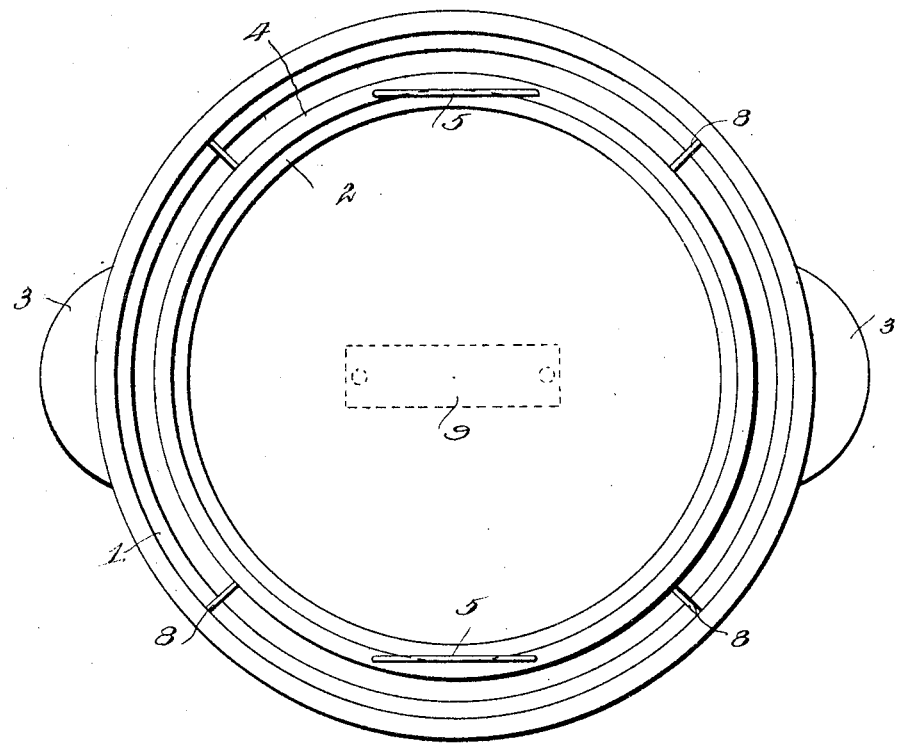
Figure 2:
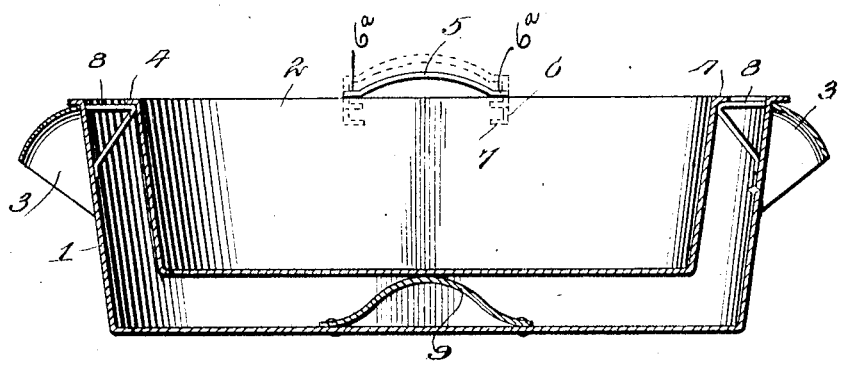

In the accompanying drawing,—Figure 1 is a top plan view of a drip pan embodying my invention. Fig. 2 is a vertical section of the same.

The pan comprises shallow outer and inner vessels 1 and 2, the former being provided with diametrically disposed socketed handles 3, the upper walls of which provide convenient surfaces under which the fingers of the hand or a suitable implement may be engaged to force the pan beneath the refrigerator and to withdraw it therefrom. The vessels are preferably cylindrical in form and of different depths and diameters, the inner vessel 2 being of less depth and diameter than the outer vessel 1, so that it may be concentrically supported therein and spaced therefrom at the bottom and around all sides.

The inner vessel 2 is provided with an outturned rim 4 and handles 5, each handle comprising a bowed strip having depending arms 6 fitted in vertical openings in said rim and formed below the same with inturned or hooked extremities 7. The arms 6 are slidably mounted in the openings in the rim so that the handles 5 will normally drop by gravity to a lowered position, so that they will not form obstructions to the free passage of the tray below the bottom edge of the refrigerator, and so that upon the withdrawal of the pan the handles may be lifted to permit the fingers to be hooked thereunder for convenience in applying and removing the inner vessel. Each handle 5 is provided at its point of junction with its arms 6 with straight or flattened portions $6^a$ to rest upon the rim when the handle is in a lowered position and to form an effective support therefor, leaving the bowed portion of the handle projecting sufficiently to be conveniently gripped.

In order to support the inner vessel within the outer vessel brackets 8 are secured to the outer vessel and project inwardly therefrom in position to form seats upon which the rim 4 rests. A bowed or arched supporting strip 9 is also secured to the bottom of the outer vessel and on which the bottom of the inner vessel is designed to rest to relieve the brackets from the strain of the entire weight.

In operation, the drip water from the refrigerator enters the inner vessel 2 and overflows therefrom into the outer vessel 1. Owing to the fact that both vessels are always open at the top and the water enters the inner vessel before passing into the outer vessel, a sufficient interval elapses to expose the water to the atmosphere to reduce its temperature to approximately that of the atmosphere before it passes into the outer vessel, whereby atmospheric condensation and the deposit of moisture upon the outside of the outer vessel, such as would occur if the water passed directly into the outer vessel, is effectually prevented. As a consequence, the pan will not sweat, and no water of condensation will be formed to drip upon the floor or floor covering. Upon the withdrawal of the filled pan from beneath the refrigerator it will be understood that the vessels are disconnected, whereupon they may be conveniently emptied and cleaned. It will, of course, be understood that the outer vessel need not be employed as an overflow receptacle but simply as a support for the inner vessel and to provide an air space therearound, whereby the outer vessel will form an inclosure to prevent the pan from sweating. Under such conditions of service the inner vessel will be emptied as soon as it becomes filled.

Having thus described the invention, what is claimed as new, is:—

A refrigerator drip pan comprising an outer vessel having a series of brackets arranged at suitable distances apart on its upper inner surface, an inner vessel mounted in the outer vessel and having a surrounding rim flange to contact with said brackets to provide a continuous space between the bottoms and walls of the two vessels, said space serving to receive the overflow from the inner vessel, a plurality of diametrically oppositely arranged openings in the flange of the inner vessel, bowed handles with hook ends serving to engage said openings to permit of the same having vertical movement therein, and an arched strip secured centrally to the bottom of the inner vessel which serves to reinforce said brackets when the rim of the inner vessel is arranged thereon, substantially as specified.

In testimony whereof, I affix my signature in presence of two witnesses.

MARY A. NASH.

Witnesses:
H. T. AVERY,
P. H. SHAEVE.